MAGNETIC RECORDING AND REPRODUCING DEVICE

Filed Dec. 6, 1963 4 Sheets-Sheet 1

Inventor
Toshihiko Numakura by Hill, Sherman, Meroni, Gross & Simpson

Attys.

March 7, 1967 TOSHIHIKO NUMAKURA 3,308,232

MAGNETIC RECORDING AND REPRODUCING DEVICE

Filed Dec. 6, 1963 4 Sheets-Sheet 2

Inventor
Toshihiko Numakura by Hill, Sherman, Meroni, Gross & Simpson Attys.

March 7, 1967 TOSHIHIKO NUMAKURA 3,308,232

MAGNETIC RECORDING AND REPRODUCING DEVICE

Filed Dec. 6, 1963 4 Sheets-Sheet 3

Inventor
Toshihiko Numakura by Hill, Sherman, Meroni, Gross & Simpson Attys.

MAGNETIC RECORDING AND REPRODUCING DEVICE

Filed Dec. 6, 1963

Inventor
Toshihiko Numakura by Hill, Sherman, Meroni, Gross & Simpson
Attys.

3,308,232
Patented Mar. 7, 1967

3,308,232

MAGNETIC RECORDING AND REPRODUCING DEVICE

Toshihiko Numakura, Tokyo, Japan, assignor to Sony Corporation, Tokyo, Japan, a corporation of Japan Filed Dec. 6, 1963, Ser. No. 328,618
Claims priority, application Japan, Dec. 7, 1962, 37/55,540
11 Claims. (Cl. 178—6.6)

This invention relates to a magnetic recording and reproducing device, more particularly to a magnetic video tape recording device, namely VTR in which video signals are recorded and played back. The present invention is suitable for use in the magnetic recording and reproducing system disclosed in the U.S. patent application Serial No. 202,742 filed June 15, 1962, now U.S. Patent No. 3,188,385 issued June 8, 1965. In this system magnetic tracks are formed on a wide magnetic tape oblique to the direction of travel of the tape and each track is used for one field or one frame of video signals. In this case vertical blanking signals are recorded in an upper zone of the magnetic tape and video signals other than the vertical blanking signals are recorded in a lower zone. Since the blanking signals and/or the video signals are recorded up to the margin of the tape, control tracks or sound tracks are affected thereby.

Accordingly, one object of the present invention is to provide an improved device in which spurious components resulting from control signals or sound signals are prevented.

Another object of the present invention is to provide improvements in or relating to a reproducing amplifier circuit for recorded signals.

A further object of the present invention is to provide a reproducing amplifier having a band-pass characteristic.

A yet further object of the present invention is to provide a device in which reproduced vertical blanking signals are mixed with other video signals through a band-pass filter.

Other objects, features and advantages of this invention will become apparent from the following description taken in conjunction with the accompanying drawings, in which.

Figure 3:
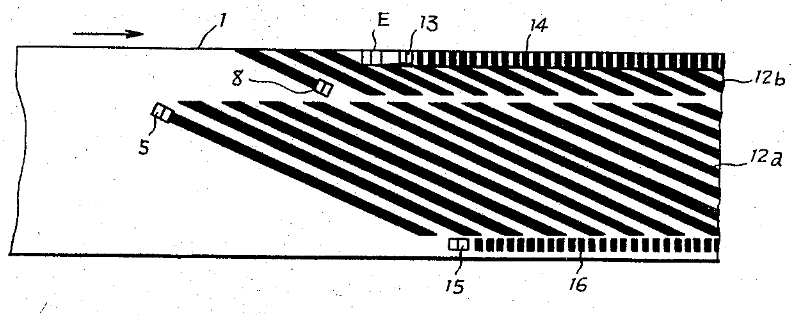
Figure 4:
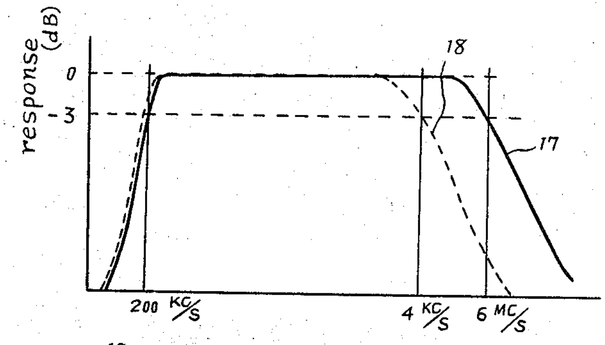
Figure 5:
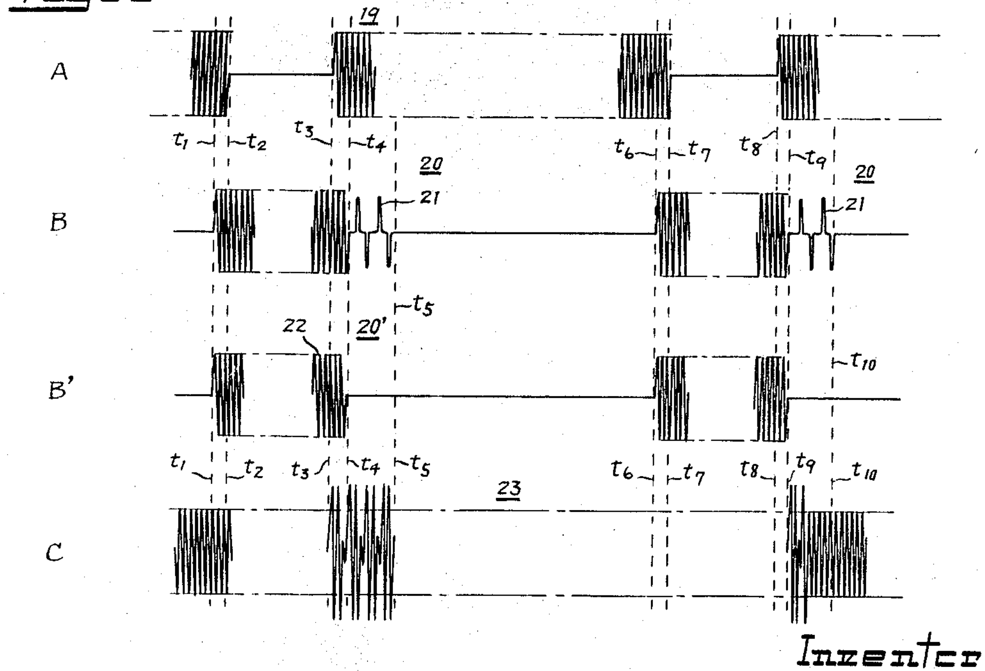
Figure 6:
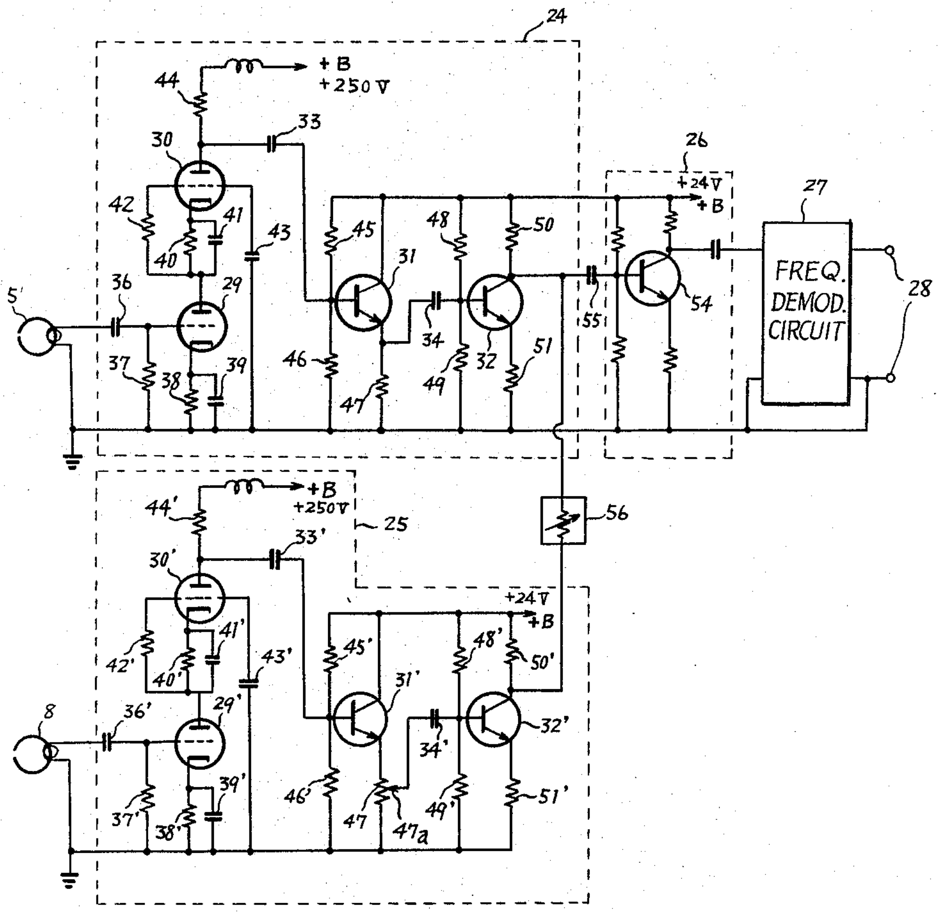
Figure 9:
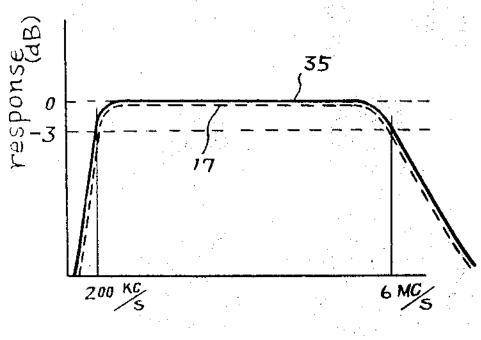
Figure 10:
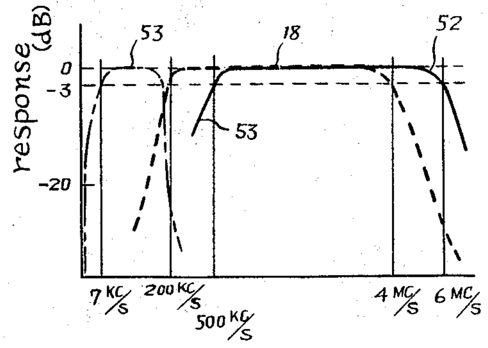

FIGURE 3 similarly shows tracks formed on a magnetic tape;

FIGURE 4 is a graph illustrating a frequency characteristic of a video signal;

FIGURES 5A, 5B, 5B' and 5C are video signal wave form diagrams;

FIGURE 6 is a circuit diagram illustrating an example of a magnetic video signal reproducing circuit;

FIGURES 7A to 7C are video signal wave form diagrams similar to FIGURE 5;

FIGURES 8A to 8C are also video signal wave form diagrams;

FIGURE 9 is a frequency characteristic curve of the reproducing circuit shown in FIGURE 6; and FIGURE 10 is also a frequency characteristic curve of the reproducing circuit shown in FIGURE 6.

Firstly, the system set forth in the aforementioned U.S. application Serial No. 202,742 (U.S. Patent No. 3,188,385) will hereinbelow be explained with reference to FIGURE 1. 1 is a wide magnetic tape and 2 is a rotary magnetic head assembly. 3 and 7 are cylindrical or columnar guide members for guiding the magnetic tape 1. On the center axis of the guide member 3, there is journalled a rotary disk 6 provided with a magnetic head 5. The tip of the rotary magnetic head 5 is disposed on the outer periphery of the guide member 3 or slightly projecting therefrom. Close to the rotary disk 6, another rotary disk 9 having a magnetic head 8 is mounted on a rotary shaft 4. There is formed an acute angle alpha ($\alpha$) between the magnetic heads 5 and 8 with respect to the rotary shaft 4.

Placed adjacent the guide members 3 and 7 are guide rollers 10*a* and 10*b* oblique to the rotary shaft 4 with the result that the magnetic tape 1 is driven in contact with the outer periphery of the guide members obliquely to the plane of revolution of the rotary magnetic heads. On the guide rollers 10*a* and 10*b*, flanges 11*a* and 11*b* are formed for limiting up-and-down movement of the magnetic tape 1. The two magnetic heads 5 and 8 are driven by a motor (not shown) to rotate counterclockwise. Accordingly, when the magnetic tape 1 travels counterclockwise the magnetic head 8 begins to scan the tape from substantially an intermediate portion thereof (not from the marginal portion of the tape), as is apparent from FIGURE 1. Thus the magnetic head passes across the upper margin of the magnetic tape 1 and then moves out of contact with the tape. As a result of this scanning, skew magnetic tracks 12*b* are formed in one recording zone 1*b*. While the magnetic head 5 starts to scan the tape 1 from a place slightly spaced from the lower margin thereof toward the inner portion and runs out of contact with the tape 1 at the inner portion. Thus obliquely extending magnetic tracks 12*a* are formed in the other recording zone 1*a*. In such a case, at least either the magnetic track 12*a* or 12*b* is compelled to extend entirely to the edge of the magnetic tape 1.

In the meantime, control signals are required in the magnetic video recording device in order that the rotary magnetic heads 5 and 8 may accurately scan and offset the recorded magnetic tracks 12*a* and 12*b* during reproducing. At the same time sound signals are also required. As is well known, the control signal and the sound signal are recorded on the magnetic tape 1 in the longitudinal direction thereof. It is important in what place of the magnetic tape 1 these control signal and the sound signal are recorded. In order that they may not overlap on the recorded tracks 12*a* and 12*b* of the video signals, they must be recorded either in the lower marginal portion of the magnetic tape 1 or between the recording zones 1*a* and 1*b*. However, it is difficult in practice to record the control signal or the sound signal between the recording zones 1*a* and 1*b*, since the space therebetween is extremely narrow. In view of such fact, it has come to be considered to record the control signal and the sound signal in the upper and lower marginal portions respectively. In this case one portion of the magnetic tracks 12*b* is, of course, erased.

In the present invention one portion of the magnetic tracks of the vertical blanking signals is erased and the control signals are recorded in the erased portion. Because the frequency of the control signal is always very low such as 60 cycles per second, 240 cycles per second or 480 cycles per second as compared with that of the sound signal, it is not advantageous to record the sound signals on magnetic track 14 of the zone 1*b*, as will be described later.

Figure 1:
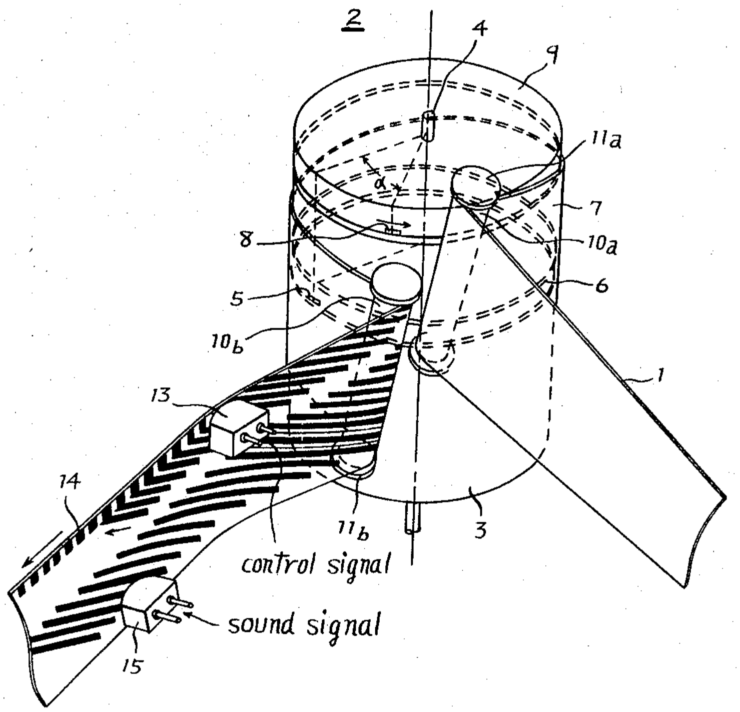
FIGURE 1 is a perspective view schematically illustrating a magnetic signal reproducing device for use in the present invention.
Figure 2:
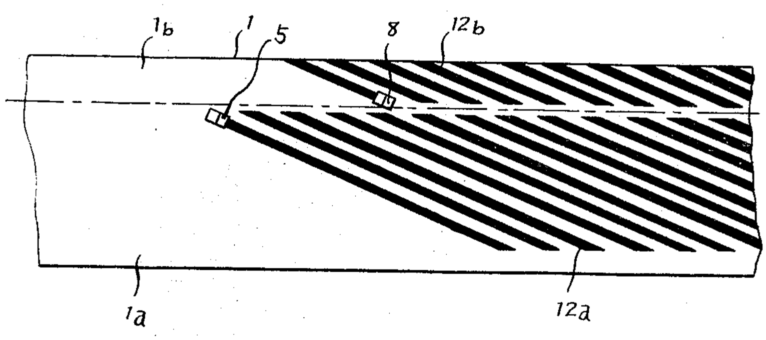
FIGURE 2 shows tracks formed on a magnetic tape, for explaining the device shown in FIGURE 1.

In FIGURE 1, 13 is a magnetic head for recording and reproducing the control signals, which is contacted with the upper margin of the magnetic tape 1 to form the magnetic track 14 in the longitudinal direction of the tape as illustrated in FIGURE 3. The erase head which precedes head 13 to clear the upper margin portion of zone 1*b* for track 14 has not been shown in FIGURE 1, but is indicated at E in FIGURE 3. 15 is a magnetic head for recording and reproducing the sound signals, which is contacted with a lower margin portion of the tape 1 to form magnetic track 16 as shown in FIGURE 3.

The frequency characteristics of the video signal, the control signal and the sound signal will hereinbelow be explained.

When the video signals are magnetically recorded on the magnetic tape 1 they are usually recorded after being converted into frequency modulated signals. Their band width is required to be, for example from 200 kilocycles per second to 6 megacycles per second as shown by the curve 17 in FIGURE 4. On the other hand, the frequency band of vertical blanking signals is 200 kilocycles per second to 4 megacycles per second as shown by the curve 18 in FIGURE 4 when they are converted into frequency modulated signals, since merely vertical synchronizing pulses, horizontal synchronizing pulses and equalizing pulses exist in the frequency band.

The band width of the control signals is usually 60 cycles per second, 240 cycles per second or 480 cycles per second, and the signals are recorded directly on the track 14 on the magnetic tape 1.

The sound signals have a band of about from 0 to 15 kilocycles per second and are recorded directly on the track 16 of the magnetic tape 1.

I will hereinbelow explain the reproduction of signals magnetically recorded with the aforementioned frequency characteristics by the use of the magnetic recording and reproducing device described above.

The video signals are sequentially reproduced by the rotary magnetic heads 5 and 8. In FIGURE 5A, 19 shows the video signals reproduced by the magnetic head 5. Indicated at the numeral 20 in FIGURE 5B are signals resulting from reproducing the magnetic tracks 12b by the magnetic head 8. It is apparent from the foregoing that the magnetic head 8 is compelled to scan the tape 1 across the control tracks 14. As a result, signals or noises due to the scanning of the control signal track 14 are caused at the places succeeding to the video signals (vertical synchronizing signals). In FIGURE 5B, 21 illustrates their signal components and 22 shows frequency modulating signals of the vertical blanking signals.

In the foregoing the control signals are low frequency signals of such as 60 cycles per second, 240 cycles per second or 480 cycles per second and they are recorded directly on the magnetic tape in the longitudinal direction thereof. The magnetic head 8 of high speed scans the tape 1 obliquely to the direction of travel thereof, so that signals of higher frequency than that of the control signal are reproduced from the magnetic head 8. This frequency is determined in accordance with the revolution speed of the rotary magnetic head 8 and the speed of travel of the magnetic tape 1. If the frequency of the control signal is 60 cycles per second when the speed of the magnetic tape is 15 centimeters per second and the revolution speed of the rotary head 8 relative to the tape is $15\times10^2$ centimeters per second, the frequency is reproduced to be a frequency of about 7 kilocycles per second such as indicated at the numeral 21. This frequency component is quite unnecessary for the video signal and must be eliminated.

In FIGURE 5C, the numeral 23 indicates a series of signals produced by mixing the two signals 19 and 20, in which noises are contained in the intervals $t_4$ to $t_5$ and $t_9$ to $t_{10}$. Because of these noises the upper portion of a reproduced picture is appreciably damaged.

From a consideration of the foregoing, the present invention is intended to essentially prevent the spurious signal components 21 from mixing into the video signals 23 when the signals 19 and 20 reproduced by the magnetic heads 5 and 8 are applied to a mixing circuit to produce a train of video signals.

A device and circuit for this purpose are illustrated in FIGURE 6, in which the aforementioned magnetic heads 5 and 8 are shown at the left. By these magnetic heads 5 and 8 the signals 19 and 20 such as shown in FIGURES 5A and 5B are produced. At the next stage of the magnetic heads 5 and 8, there are provided video signal amplifier circuits 24 and 25 and signals amplified by these amplifier circuits are supplied to a mixing circuit 26. The output of the mixing circuit 26 is supplied to a frequency demodulator 27, obtaining demodulated signals at its output terminal.

The amplifier circuit 24 has a characteristic such that the video signals reproduced by the magnetic head 5 are permitted to pass essentially over the entire band thereof. While the amplifier circuit 25 has a band-pass characteristic such that the unnecessary signals 21 of the signal 20 shown in FIGURE 5B which have been reproduced by the magnetic head 8 are essentially prevented from passing.

The amplifier circuit 24 is composed of vacuum tubes 29 and 30 and transistors 31 and 32 in FIGURE 6. The vacuum tubes 29 and 30 are connected to each other in cascade, and the signal 19 such as shown in FIGURE 5A is applied between the grid of the vacuum tube 29 and the ground, obtaining an amplified signal at the plate of the vacuum tube 30. The plate of the vacuum tube 30 is connected through a coupling capacitor 33 to the base of the transistor 31 formed to be of the emitter-follower type. The output end, namely the emitter of the transistor 31 is connected through a coupling capacitor 34 to the base of the transistor 32 formed to be of the emitter-ground type. The value of the capacitors 33 and 34 exerts a great influence upon the band-pass characteristics of the signals. When the video frequency modulated signal has a band-width of from 200 kilocycles per second to 6 megacycles per second as shown in FIGURE 4, the values of capacitors 33 and 34 may be, for example, 0.005 microfarad and 0.05 microfarad, respectively. The required values correspond to such a reactance component as not to essentially diminish the band-pass characteristic, or prevent the amplifier 24 from passing its entire band width. In the amplifier circuit 24, 36 is a coupling capacitor for the magnetic head 5 and the vacuum tube 29, 37 is a grid resistor of the vacuum tube 29, 38 and 39 are respectively a cathode resistor and by-pass condenser, 40 and 41 are respectively a coupling resistor and a by-pass capacitor between the plate of the vacuum tube 29 and the cathode of the vacuum tube 30, 42 and 43 are respectively a grid resistor and a by-pass capacitor of the vacuum tube 30, and 44 is a load resistor of the vacuum tube 30, which is connected to a power source (+250 volts). 45 and 46 are base bias resistors for the transistor 31, 47 is an emitter load resistor, 48 and 49 are base bias resistors for the transistor 32, 50 is a collector load resistor, and 51 is an emitter resistor. One end of the resistor 45, the collector of the transistor 31 and one end of the resistors 48 and 50 are connected to a power source (+24 volts).

On the other hand, the amplifier circuit 25 is also connected in the same manner except one portion described later. Therefore, its corresponding parts to those of the amplifier circuit 24 are marked with the same numeral references but with primes affixed thereto. A difference between the amplifier circuits 24 and 25 lies in the capacitance values of interstage coupling capacitors 33' and 34'. That is, each of the capacitors 33' and 34' has a value of, for example, 50 picofarads (50 micromicrofarads or $50\times10^{-12}$ farads) and has an impedance large enough to attenuate at low frequency range the signal 20 reproduced by the magnetic head 8 such as shown in FIGURE 5B. It must be noticed that the capacity of the capacitor 33 of the amplifier 24 is 0.005 microfarad, namely 5000 picofarads (5000 micromicrofarads), while the value of the capacitor 33' is 1/100 of the above capacity.

A further difference between the amplifier circuits 25 and 24 resides in that the output amplitude of the signal 20 to be obtained from the amplifier circuit 25 is about 1/4 of the output amplitude to be obtained from the amplifier circuit 24 and hence the output end of, for instance the transistor 31' is connected from a tap point 47*a* of its emitter resistor 47'.

Figure 7:
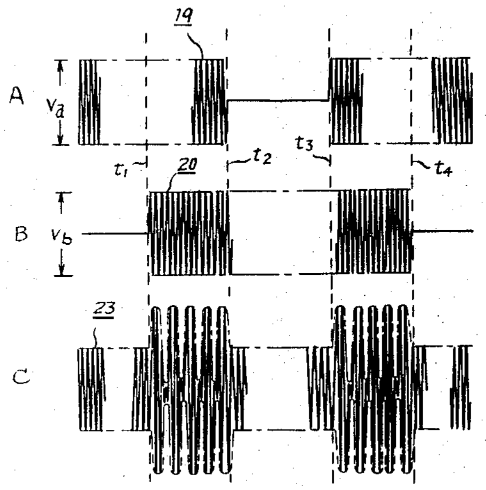
Figure 8:
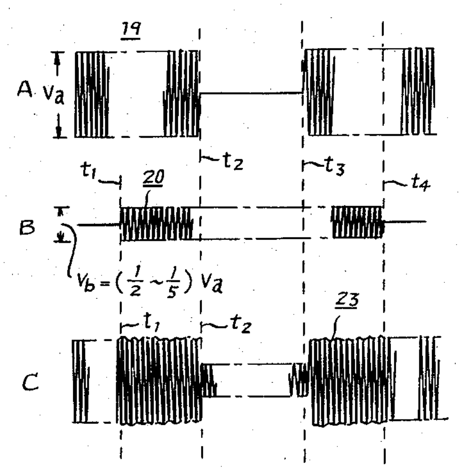

This feature has been disclosed in the U.S. application Serial No. 224,707 filed September 19, 1962 now U.S. Patent No. 3,239,603 issued March 8, 1966 but it will become apparent from the following description with reference to FIGURES 7 and 8. That is, when obtaining a composite signal 23 by mixing the signals 19 and 20 in FIGURE 5 beat is produced due to the phase difference of the two signals in the intervals $t_1$ to $t_2$ and $t_3$ to $t_4$ in which the signals 19 and 20 have overlapped (the component 21 in the signal 20 is omitted from the explanation), so that amplitude modulated signals are produced. Therefore, it the amplitudes V*a* and V*b* of the signals 19 and 20 are equal to each other as illustrated in FIGURES 7A and 7B, the composite signal 23 comes to contain a considerable amount of noise in the overlapping intervals $t_1$ to $t_2$ and $t_3$ to $t_4$ as shown in FIGURE 7C.

To avoid this, the amplitude V*b* of the signal 20 is made ½ to ⅕ of the amplitude V*a* of the signal 19 as illustrated in FIGURES 8A and 8B and then they are mixed. At this time substantially no variation of the amplitude is produced in the overlapping intervals of the two signals 19 and 20 as shown in FIGURE 8C and accordingly no noise is produced in the composite signal 23. The amplitude level lowers in the interval $t_2$ to $t_3$ of the signal 23, but this does not matter. For the reasons described above, the output end of the transistor 31' of the amplifier circuit 25 is connected through the tap point of the resistor 47' to its next stage transistor 32'. It will, of course, be seen that the amplitude level of a signal obtained at the input end of the mixing circuit 26 from the amplifier circuits 24 and 25 may be varied by suitable means, for example an attenuator 56.

In practice the frequency characteristic of the amplifier circuit 24 is 200 kilocycles per second to 6 megacycles per second as illustrated by the curve 35 in FIGURE 9, which characteristic exactly coincides with the frequency characteristic of the reproduced signal shown by the curve 17 in FIGURE 4.

The frequency characteristic of the amplifier circuit 25 is 500 kilocycles per second to 6 megacycles per second as illustrated by the curve 52 in FIGURE 10. The curve 18 shows the frequency characteristic of a signal to be reproduced. This characteristic is obtained by the coupling capacitors 33' and 34' due to the characteristic of a RC differentiation circuit formed with the resistors 45', 46', 48' and 49' connected to the capacitors. Consequently the band 200 to 500 cycles per second of the signal 22 reproduced by the magnetic head 8 is not transmitted, but this does not matter. Especially the signal reproduced by the magnetic head 8 is primarily a vertical blanking signal so that the picture is not deteriorated due to it. It has been described in the foregoing that the unnecessary signal component 21 contained in the signal 20 is about 7 kilocycles per second, but this frequency is a fundamental wave signal and contains its higher harmonics therein. According to our experiments, it has been found that a noise due to the higher harmonics is essentially prevented by sufficiently eliminating higher harmonic components from the 20th up to 30th order of the fundamental wave. However, since the band-pass characteristic of the amplifier circuit 25 is 500 kilocycles per second to 6 megacycles per second as described above, the signal 21 is essentially intercepted. (The signal 21 is considered to be distributed under at least 200 kilocycles per second as indicated by curve 53 in FIGURE 10.) Accordingly, the signal 20 such as shown in FIGURE 5B can be made to be a signal 20' such as shown in FIGURE 5B'. As is apparent from the foregoing, the fundamental frequency band of the sound signal is 0 to 15 kilocycles, so that it cannot be recorded on the track 14.

The outputs of the amplifier circuits 24 and 25 are supplied to a mixing circuit 26. In FIGURE 6, the mixing circuit 26 is formed with a transistor 54, in which the above outputs are supplied to the base of the transistor 54 through a coupling capacitor 55, reproducing a series of video frequency modulating signals 23 such as illustrated in FIGURE 8C. According to the present invention, noises are not contained in the overlapping portions of the signals 19 and 20. Furthermore no noise due to the control signal is mixed.

It will be apparent to those skilled in the art that the video signal 23 obtained in the mixing circuit 26 is applied to a frequency demodulating circuit 27 to reproduce the video signal.

A list of suitable circuit values which may be used to construct an operative circuit as above described is as follows:

| | |
|---|---|
| Vacuum tubes **29, 30** (respectively) | 6DJ8 |
| Transistors **31, 31', 32, 32', 54** (respectively) | 2SC15 |
| Capacitors: | |
| **33** ____microfarads | 0.005 |
| **33'** ____picofarads | 50 |
| **34** ____microfarads | 0.05 |
| **34'** ____picofarads | 50 |
| **36** ____microfarads | 0.001 |
| **36'** ____picofarads | 50 |
| **39, 39'** ____microfarads | 0.05 |
| **41, 41'** ____do | 0.05 |
| **43, 43'** ____do | 0.01 |
| **55** ____do | 0.05 |
| Resistors (values in kiloohms unless otherwise specified): | |
| **37, 37'** | 15 |
| **38, 38', 40, 40'** ____ohms | 68 |
| **42, 42'** | 33 |
| **44, 44'** | 1.5 |
| **45, 45'** | 15 |
| **46, 46'** | 15 |
| **47** | 1 |
| **47'** | [1] 1 |
| **48, 48'** | 47 |
| **49, 49'** | 15 |
| **50, 50'** ____ohms | 560 |
| **51, 51'** ____do | 120 |

[1] Variable resistor.

As has been described in the foregoing, the present invention is greatly advantageous in that the undesirable noise components produced in reproduction of the video signals may be prevented in the coupling stages of the amplifier circuits and hence a simplified video recording and playback system becomes feasible.

It is seen that the band-pass characteristics of the amplifiers 24 and 25 are selected as desired in the foregoing. Furthermore, by providing a suitable band-pass filter at the preceding stage of the mixing circuit, exactly the same operation and effect as the above-described may be obtained without providing the amplifier 25 with a band-pass characteristic.

It will be apparent that many modifications and variations may be effected without departing from the scope of the novel concept of the present invention.

I claim as my invention:

1. A magnetic transducer device comprising (a) a magnetic medium, (b) an obliquely scanning magnetic head for scanning oblique magnetic tracks on said magnetic medium containing video signals, (c) another magnetic head for scanning a longitudinal magnetic track on the magnetic medium containing control signals, said first-mentioned magnetic head being compelled to scan the longitudinal control signal track, (d) circuit means connected to said first-mentioned obliquely scanning magnetic head for receiving reproduced video signal components produced by oblique scanning of said oblique magnetic tracks and for receiving reproduced control signal components produced by oblique scanning of said longitudinal control signal track, and (e) said circuit means having a frequency selective transmission characteristic to transmit essential frequency components of said reproduced video signal components but to substantially attenuate and essentially to eliminate frequency components corresponding to the fundamental and a plurality of harmonics of said reproduced control signal components for removing said reproduced control signal components during reproducing.

2. A magnetic transducer device as claimed in claim 1, wherein the reproduced components of said control signals are lower than about 200 kilocycles and said circuit means substantially attenuates all frequency components below about 200 kilocycles per second.

3. A magnetic transducer device as claimed in claim 1, wherein said video signals have a frequency band consisting essentially of frequencies higher than 200 kilocycles, and said circuit means substantially attenuates all frequency components below about 200 kilocycles per second.

4. A magnetic recording and reproducing device comprising (a) at least two rotary magnetic heads for reproducing video signals, (b) means for recording on a plurality of recording zones of a magnetic medium by means of said rotary magnetic heads, (c) means for recording in at least one of said recording zones low frequency signals other than said video signals and said low frequency signals having lower frequency components than said video signals, (d) means for reproducing the low frequency signals other than said vedio signals during reproducing, (e) at least two amplifier circuits, (f) means for supplying the outputs of said two rotary magnetic heads to said amplifier circuits respectively, (g) means for providing at least one of said amplifier circuits with a band-pass characteristic to essentially intercept frequency components other than said video signals reproduced by the rotary magnetic head scanning said one of said recording zones, and (h) means for mixing the outputs of said two amplifier circuits.

5. A magnetic recording and reproducing device as claimed in claim 4, wherein one of said recording zones contains vertical blanking signals.

6. A magnetic recording and reproducing device as claimed in claim 4, wherein the output amplitudes of said two amplifier circuits are different from each other.

7. In a transducer device including a plurality of obliquely scanning transducer heads for oblique scanning of respective transversely offset zones of a tape record medium to reproduce respective signals recorded thereon, one of the oblique scanning heads scanning across one side margin of the tape record medium, a further longitudinally scanning transducer head for longitudinal scanning of a longitudinally recorded track extending along said one side margin of the record medium, circuit means for coupling with the respective obliquely scanning transducer heads to receive the respective signals reproduced thereby during scanning of the record medium and for transmitting respective amplified signals, and mixing means connected to said circuit means for mixing the amplified signals therefrom to provide a composite signal, said device comprising frequency selective circuit elements in the one of said circuit means coupled to said one of said obliquely scanning heads and having a frequency selective transmission characteristic for rejecting spurious components of the signal reproduced by said one of said head caused by said one of said heads obliquely scanning said longitudinally recorded track while transmitting essential frequency components of the signal recorded on the zone scanned by said one of said heads, said frequency selective circuit elements rejecting the fundamental and a plurality of harmonics of said spurious components.

8. The transducer device of claim 7 with said one of said heads scanning an obliquely recorded series of tracks in one of said zones carrying vertical blanking signals, and the oblique scanning of the longitudinally recorded track producing a fundamental and harmonics of said spurious components lying in a range below about 200 kilocycles per second, said circuit means including said frequency selective circuit elements transmitting with substantial amplification reproduced vertical blanking signal components in a range above about 500 kilocycles per second while rejecting frequencies below 200 kilocycles per second.

9. The transducer device of claim 8 with said circuit means coupled to said one of said obliquely scanning heads including said circuit elements providing a band pass characteristic for frequencies in a range above about 500 kilocycles per second.

10. The transducer device of claim 1 with said circuit means comprising an amplifier circuit having a band pass characteristic for frequencies in a range above about 500 kilocycles per second.

11. The transducer device of claim 1 with said circuit means comprising a band-pass filter having a band pass characteristic for frequencies in a range above about 500 kilocycles per second.

References Cited by the Examiner

UNITED STATES PATENTS 3,239,603 3/1966 Kihara ------------- 178—6.6

DAVID G. REDINBAUGH, *Primary Examiner.*

H. W. BRITTON, *Assistant Examiner.*